(12) United States Patent
Meyer et al.

(10) Patent No.: US 6,470,247 B1
(45) Date of Patent: Oct. 22, 2002

(54) VEHICLE HYDRAULIC SYSTEM MONITORING SYSTEM AND METHOD

(75) Inventors: Duane Fredrick Meyer, Hudson; Edwin Lee Eisele, Waterloo; Reno Antonio Rodeghiero, Hudson, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/974,356

(22) Filed: Oct. 9, 2001

(51) Int. Cl.$^7$ ................................................ G06F 7/00
(52) U.S. Cl. .......................................... 701/29; 701/34
(58) Field of Search ............................. 701/29, 30, 33, 701/34; 73/168; 60/325; 172/812; 180/242

(56) References Cited

U.S. PATENT DOCUMENTS

| | | | |
|---|---|---|---|
| 4,445,168 A | 4/1984 | Petryszyn | 364/140 |
| 4,488,140 A | 12/1984 | Lang et al. | 340/57 |
| 4,489,305 A | 12/1984 | Lang et al. | 340/57 |
| 4,489,311 A | 12/1984 | Lang et al. | 340/501 |
| 4,640,401 A | 2/1987 | Koltookian | 192/85 R |
| 5,540,299 A * | 7/1996 | Tohda et al. | 180/243 |

OTHER PUBLICATIONS

Case Corporation, MX240 Operator's Manual, "Warning Displays"; 1998; p. 47, No month.

* cited by examiner

Primary Examiner—Yonel Beaulieu (57) ABSTRACT

A system and method are provided for monitoring a vehicle hydraulic system having a plurality of hydraulic function elements. The hydraulic system includes a hydraulic pump for supplying pressurized hydraulic fluid to the plurality of hydraulic function elements via a corresponding plurality of hydraulic element control valves, an electronic control unit for controlling the element control valves. The pump also supplies lube fluid to a lubrication circuit if requirements of the hydraulic function elements are met. The method includes sensing a hydraulic pressure (preferably the lube pressure of lube fluid in the lube circuit), and comparing the sensed pressure to a threshold pressure. If the sensed pressure is less than threshold pressure, then actively engaged hydraulic elements are tested by disengaging the elements in a predetermined manner, checking to see if the sensed low pressure condition is eliminated. If the sensed low pressure condition is eliminated after disengaging an element, then the leaking hydraulic function element (the last element disengaged) is deactivated (locked-out) and a corresponding message is generated and stored.

24 Claims, 6 Drawing Sheets

VEHICLE HYDRAULIC SYSTEM MONITORING SYSTEM AND METHOD

FIELD OF THE INVENTION

The present invention relates to a system for monitoring and protecting a vehicle hydraulic system.

BACKGROUND OF THE INVENTION

Serious damage can result when a drivetrain in a tractor is not operated at a proper operating temperature, with a proper clutch engagement pressure or with proper lubrication. Therefore, various systems have been used to protect transmissions from such conditions. For example, gages have been used to display conditions to an operator so that the operator could take appropriate action if the transmission oil temperature became higher than a threshold or if system pressure drops below a threshold. Some gages are augmented with flashing lights or audible alarms.

Another approach is a "Murphy switch" which automatically shuts an engine down if transmission oil temperature becomes higher than a threshold or if system pressure falls below a threshold.

The hydraulic system pressure level is set so that engaged transmission clutches will not slip even when transmitting full engine torque. Hydraulic system pressure is set by a pressure regulating valve. The pressure regulating valve ensures that system pressure remains above a set level even under low pump flow conditions, as is the case when the tractor is running at low idle. A system which monitors system hydraulic pressure with respect to a single warning level may be sufficient to prevent transmission clutch slippage and large hydraulic system leaks, but it may not detect low to medium sized hydraulic leaks which may result in a loss of lubrication fluid. In order to detect a full range of hydraulic leaks, the lube system needs to be monitored. However, monitoring lube pressure with respect to a single pressure level would be unsatisfactory because a transmission lube circuit will normally operate under low pressure conditions, not just when little or no lube oil is available. For example, normal lube pressure is low when the lube oil is warm and engine speed is low. Thus, using low lube pressure as a warning level will not detect leaks when the engine speed is operating at higher speeds.

A known system, marketed by Case, detects critically high engine and transmission temperature and low engine oil pressure, and shuts down the engine if these parameters are above certain thresholds.

U.S. Pat. No. 4,489,305, Lang, et al., issued in 1984 and is assigned to the assignee of this application. The Lang et al. patent describes a monitoring system for a vehicle, such as an agricultural tractor, which includes a hydraulic assist-type transmission with fluid control and lubricating circuits. The monitoring system senses the fluid pressure in the lubricating circuit, the hydraulic fluid temperature and the engine speed. The sensed pressure is compared to a temperature and engine speed-compensated alarm value. Alarm signals are generated when the sensed pressure is continuously below the alarm value for a certain period. The alarm is disabled when the engine speed falls below a non-zero threshold level. However, this system and the previously mentioned systems do not automatically shut off any hydraulic functions to determine the source of the leak, nor does it isolate or lock-out only the hydraulic function(s) that are determined to be the cause of the leak and any other affected hydraulic functions.

SUMMARY OF THE INVENTION

Accordingly, an object of this invention is to provide a system which detects and protects against small and medium size oil leaks in vehicle hydraulic systems.

A further object of the invention is to provide such a system which also determines which vehicle system is the source of the problem while the vehicle is in operation without the operator having to place the vehicle into a special mode.

A further object of the invention is to provide such a system which is responsive to recent operational status of the transmission or of other hydraulic functions to aid in determining which vehicle system is the source of the problem.

A further object of the invention is to deactivate (lock-out) only the hydraulic element(s) found to be causing a leak and any other hydraulic elements affected by the leak, while allowing all other non-affected hydraulic functions of the tractor to remain operational.

A further object of the invention is to automatically engage a limp home mode under certain low lube conditions.

These and other objects are achieved by the present invention, wherein a system and method are provided for monitoring a vehicle hydraulic system having a plurality of hydraulic function elements. The hydraulic system includes a hydraulic pump for supplying pressurized hydraulic fluid to the plurality of hydraulic function elements via a corresponding plurality of hydraulic element control valves, an electronic control unit for controlling the element control valves. The pump also supplies lube fluid to a lubrication circuit via a lube line if requirements of the hydraulic function elements are met. The method includes sensing a lube pressure of lube fluid in the lube line, and comparing the lube pressure to a threshold pressure. If the sensed lube pressure is less than threshold pressure, then actively engaged hydraulic elements are tested by disengaging the elements in a predetermined manner while the vehicle is in operation, checking to see if the sensed low lube pressure condition is eliminated. If the sensed low lube pressure condition is eliminated after disengaging an element, then the leaking hydraulic function element (the last element disengaged) is deactivated (locked-out) and a corresponding message is generated and stored. By locking-out the leaking hydraulic function element, lube pressure is returned to normal allowing all non-affected hydraulic function elements on the tractor to remain operable. In many cases, this would allow the operator to continue operating the tractor for the rest of the day until taking the tractor to the dealer for service. If after testing the previously engaged hydraulic elements, the sensed lube pressure is still below threshold pressure, then all elements are deactivated and a limp home mode is automatically enabled. Limp home mode allows the tractor to only be driven in a pre-selected forward or reverse gear. This allows the tractor to be driven onto a truck or to the dealer for service. The pre-selected forward and reverse gear is chosen so that the bearings in the transmission are moving at a relatively low speed so there is minimal risk of transmission damage under low lube conditions.

DESCRIPTION OF THE PREFERRED EMBODIMENT

Figure 1:
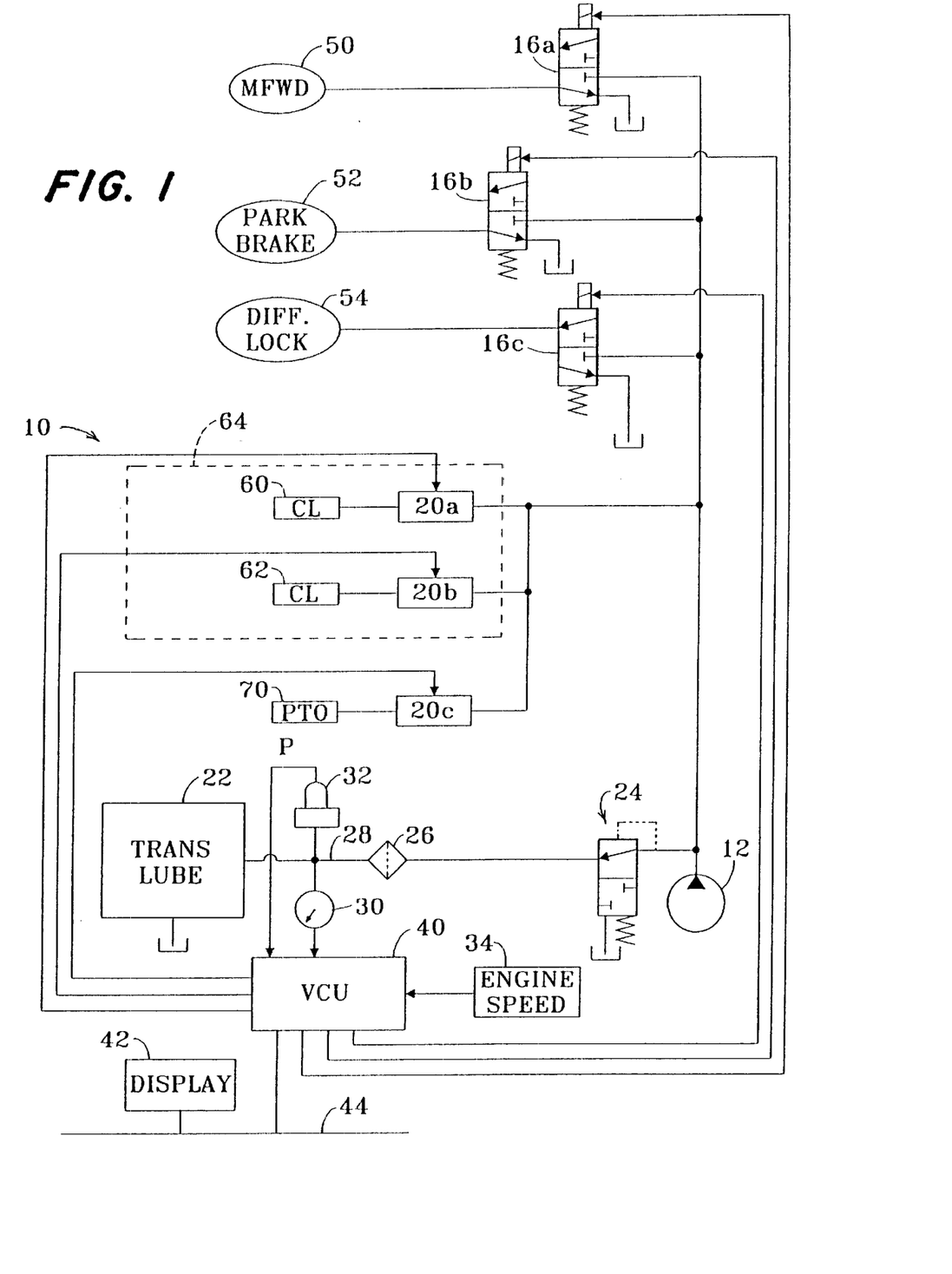
FIG. 1 is a simplified schematic diagram of a vehicle hydraulic control and lubrication system according to the present invention.

A vehicle hydraulic system 10, such as for an agricultural tractor, includes a hydraulic supply pump 12 which supplies system pressure hydraulic fluid to various hydraulic functions or elements, such as MFWD control element 50, a park brake element 52, a differential lock control element 54, etc., via a corresponding solenoid operated control valve 16A, 16B, 16C, etc. The MFWD control element 50 is preferably a spring engaged, pressure released unit, and which is normally engaged during field operation of the tractor. The park brake element 52 is preferably a spring engaged, pressure released park brake, which is released when the tractor is moving. The differential lock control element 54 is preferably a pressure engaged, spring disengaged differential lock unit which is normally disengaged.

The pump 12 also supplies system pressure to a plurality of other hydraulic elements, such as transmission control clutch elements 60, 62, of a conventional powershift transmission 64, such as the powershift transmission on 8000 Series John Deere tractors, and/or a PTO control clutch element 70. Each of these further elements is coupled to the pump 12 via a corresponding conventional element control valves 20A, 20B, 20C, etc. The term hydraulic function or element should be understood to include other known hydraulically operated functions which are used on vehicles such as agricultural tractors or other agricultural work vehicles or machines. Although only two transmission control clutch elements 60, 62 are shown it should be understood that there would be as many such elements as are part of a typical powershift transmission. With a transmission 64 as described above, two clutch elements must be engaged (an input clutch and output clutch) to transmit torque. Most of the shifts of the transmission 64 require only a single element clutch swap. However, some shifts require dual element clutch shifts, wherein two clutch elements are disengaged and two different clutch elements engaged to obtain a new gear ratio.

Figure 2:
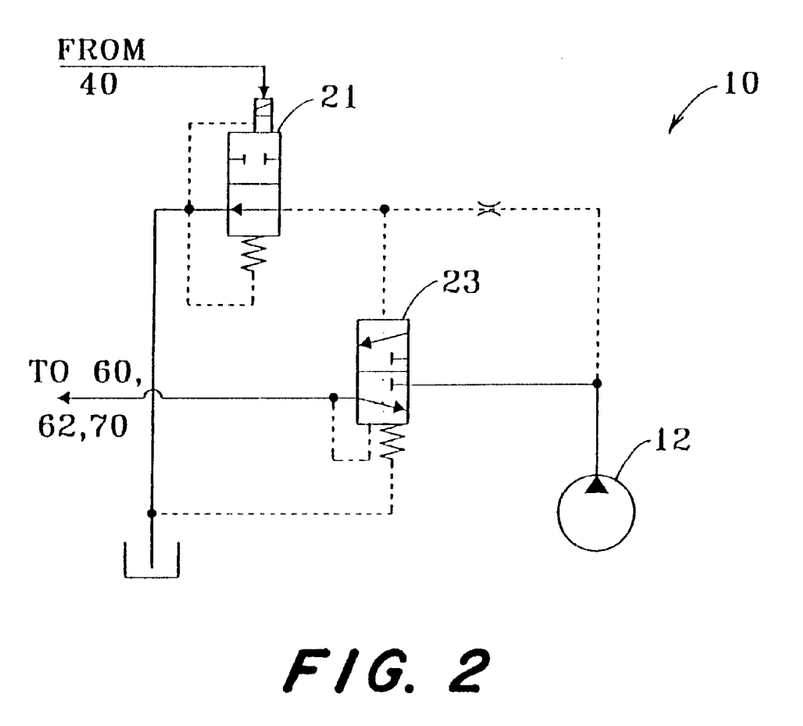
FIG. 2 is a simplified schematic diagram of a valve assembly of FIG. 1.

As seen in FIG. 2, each element control valve 20A, 20B, 20C, etc., includes a solenoid operated valve section 21 and a pilot operated section 23. The pilot operated section 23 is normally spring biased to a position which blocks communication between pump 12 and the element, and valve section 21 normally connects the pilot side of valve section 23 to sump. When the solenoid of valve section 21 is energized, communication is blocked between sump and the pilot side of valve section 23. This pressurizes the pilot side of valve section 23 and valve section 23 moves to a position connecting pump 12 to the element.

The pump 12 also supplies lubrication fluid to a transmission lube circuit 22 via a pressure regulating and system priority valve 24, an oil cooler 26 and hydraulic lube line 28. The monitoring and control system of the present invention includes an oil temperature sensor 30 which senses the temperature of lube fluid in line 28, a pressure sensor 32 which senses the pressure P of lube fluid in line 28 and an engine speed sensor 34. A control unit 40 receives signals from sensors 30, 32 and 34, supplies control signals to valves 16 and 21, and supplies information to a display 42 via a conventional data bus 44. The control unit 40 executes an algorithm 100 represented by the flow chart set forth in FIGS. 3a–3d. The conversion of this flow chart into a standard language for implementing the algorithm described by the flow chart in a digital computer or microprocessor, will be evident to one with ordinary skill in the art.

Figure 3A:
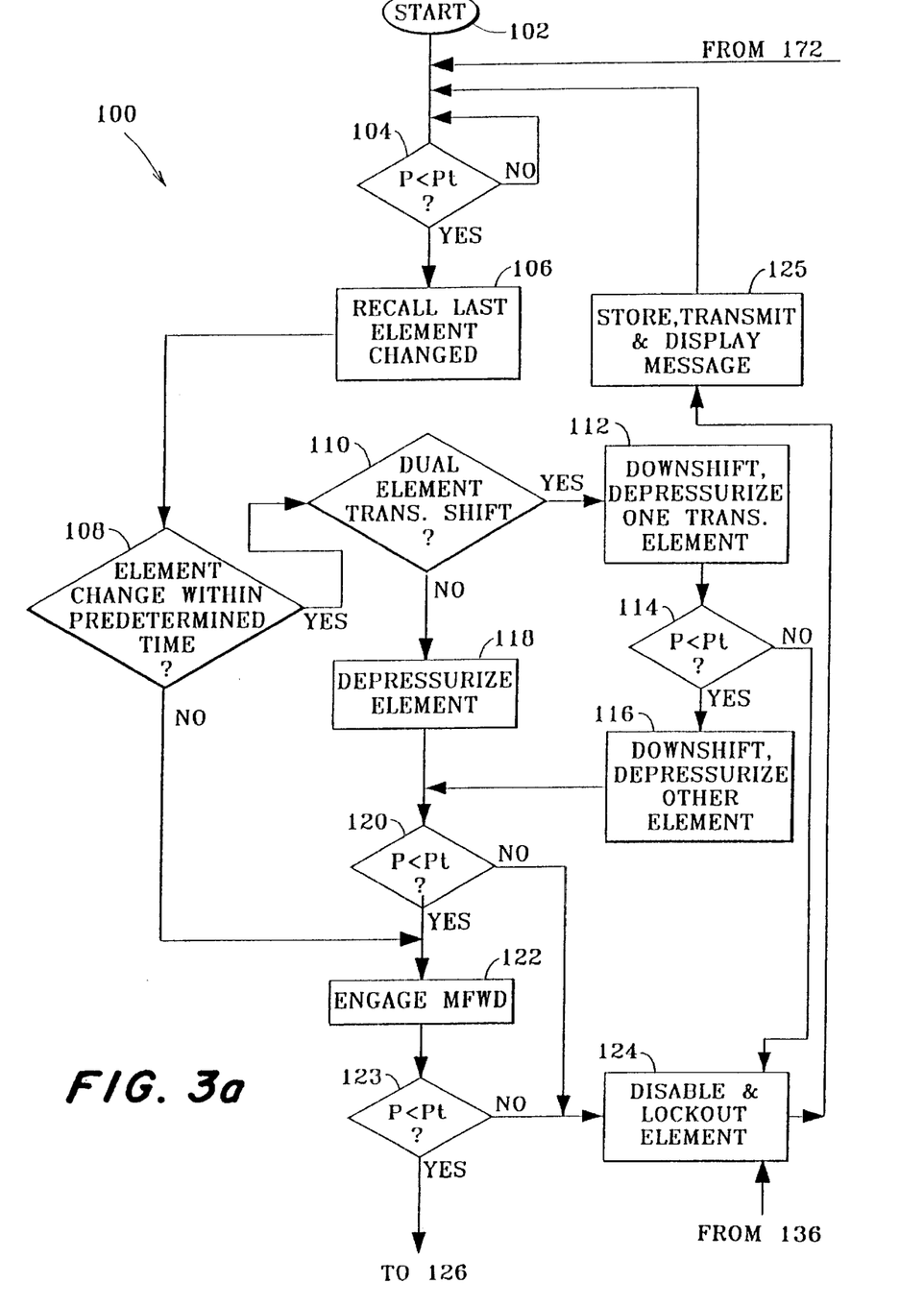
FIGS. 3a–3d comprise a logic flow diagram illustrating an algorithm executed by the control unit of FIG. 1.

After starting in step 102, step 104 determines whether the lube pressure P from sensor 32 is less than a threshold pressure Pt for a predetermined time period. If not, step 104 is repeated. Preferably, the threshold pressure Pt varies as a function of engine speed and oil temperature, as sensed by sensors 34 and 30, respectively. For example, the oil pump 12 is driven by the engine (not shown), therefore as engine speed goes up the pump provides more oil, therefore normal lube pressure is higher with higher engine speed. As an example, with oil temperature at 55 degrees C., normal lube pressure is higher than 240 kpa at 2000 engine rpm but at 1000 engine rpm, normal lube pressure is higher than 60 kpa. The colder the oil, the higher the oil viscosity which raises the normal oil pressure. Therefore the colder the oil, the normal oil pressure will also be higher. At 2000 engine rpm, normal oil pressure is greater than 240 kpa at 55 degrees C., at 25 degrees C., normal lube pressure is greater than 360 kpa.

If, in step 104 the lube pressure P from sensor 32 is less than threshold pressure Pt, then step 106 recalls from a memory the last element which was changed, and step 108 determines whether the element changed within a predetermined time period of lube pressure dropping below threshold pressure. If yes, step 110 determines whether the last element changed was a dual element transmission shift (meaning two elements in the transmission were changed at the same time to engage a gear). If not, step 108 directs the algorithm to step 122.

If, in step 110, the last element changed was not a dual element transmission shift, step 118 depressurizes the single element that changed within the predetermined time period (closes communication between that element and the pump 12). If, in step 110, the last element changed was a dual element transmission shift, step 112 downshifts the transmission 64 and depressurizes one of the pair of elements involved in the dual element transmission shift, and step 114 again compares the lube pressure P from sensor 32 to the threshold pressure Pt.

If, in step 114, the lube pressure P is less than threshold pressure Pt, control is directed to step 116 which downshifts the transmission 64, depressurizes the other element involved in the dual element transmission shift when lube pressure became less than threshold pressure and directs the algorithm to step 120. If, in step 114, the lube pressure P is not less than threshold pressure Pt, control is directed to step 124 which disables and locks out that transmission element from pump 12 until the tractor is serviced.

Step 120 is performed after either step 118 or 116, and again determines whether the lube pressure P from sensor 32 is less than a threshold pressure Pt. for a predetermined time period. If, in step 120, the lube pressure P is not less than threshold pressure Pt, control is directed to step 124. If, in step 120, the lube pressure P is less than threshold pressure Pt, control is directed to step 122 which engages the MFWD 50 by closing valve 16a and disconnecting MFWD 50 from pump 12.

Step 123 is performed after step 122, and again determines whether the lube pressure P from sensor 32 is less than a threshold pressure Pt for a predetermined time period. If, in step 123, the lube pressure P is not less than threshold pressure Pt, control is directed to step 124 which disables and locks out the disengagement of the MFWD. Step 124 directs the algorithm to step 125 which stores, transmits and displays a corresponding warning message or signal. Step 125 transmits on bus 44 a message that certain element(s) have been disabled and causes display 42 to flash a corresponding indication that element(s) have been disabled, including element(s) effecting transmission gears, and stores this message in memory. Step 125 then directs the algorithm back to step 104.

Figure 3B:
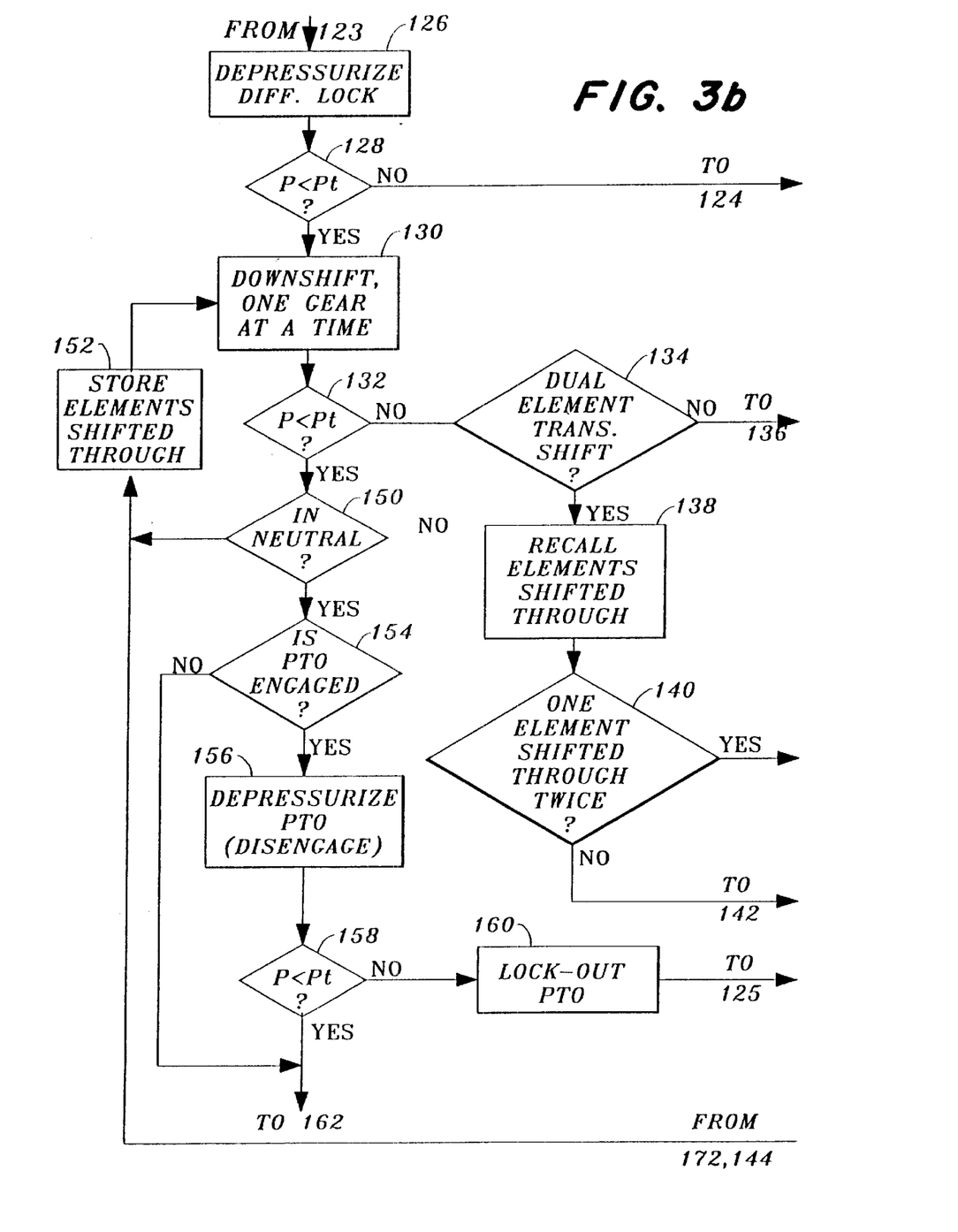

If, in step 123, the lube pressure P is less than threshold pressure Pt, control is directed to step 126. Step 126 depressurizes the differential lock 54, if the differential lock 54 was engaged.

Step 128 again determines whether the lube pressure P from sensor 32 is less than a threshold pressure Pt for a predetermined time period. If not, it is assumed that there is a leak in the circuit to differential lock 54, and steps 124 and 125 are executed. If yes, step 130 downshifts the transmission 64 by one gear ratio.

If, in step 132, the lube pressure P is not less than threshold pressure Pt, control is directed to step 134. If, in step 132, the lube pressure P is less than threshold pressure Pt, control is directed to step 150.

Figure 3C:
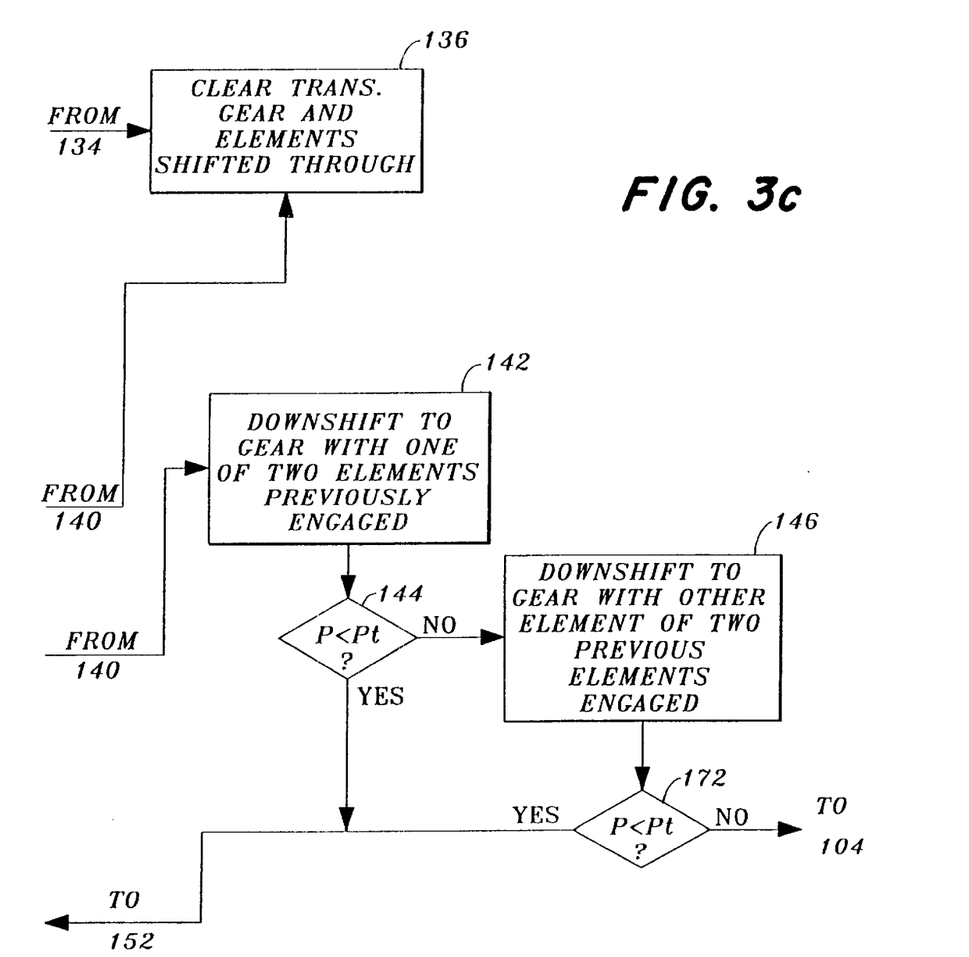

In step 134, the transmission downshift is checked to see if the shift was a dual element transmission shift (meaning two elements in the transmission were changed at the same time to engage the new gear). If no, the downshift is a single element shift (meaning only one clutch element was changed to engage the new gear). As a result, the one clutch element that was disengaged (depressurized) in the shift is now identified as the element causing low lube pressure. Step 136 clears the transmission gears and elements shifted through and directs the algorithm to steps 124 and 125 to lock-out the element, store that the element is locked-out and generate and transmit a message. If, in step 134, the transmission downshift is determined to be a dual element shift, then step 138 recalls the elements which have already been shifted through while downshifting and directs the algorithm to step 140. By recalling the elements already shifted through in step 130 the controller may be able to diagnose which clutch element is causing a system leak even during a dual element shift. For example, if $6^{th}$ gear is engaged ($6^{th}$ gear in the transmission 64 engages a C1 input clutch (not shown) and a C output clutch (not shown)) and the lube pressure is below threshold pressure, then step 130 downshifts the transmission to $5^{th}$ gear. Shifting from $6^{th}$ gear to $5^{th}$ gear is a single element clutch swap. In $5^{th}$ gear input clutch C1 (not shown) and output clutch B (not shown) is engaged. If the low lube pressure condition is not eliminated, the controller then downshifts the transmission to $4^{th}$ gear. Shifting from $5^{th}$ gear to $4^{th}$ gear is a duel element transmission shift. In $5^{th}$ gear, input clutch C1 (not shown) and output clutch B (not shown) is engaged. In $4^{th}$ gear, C4 (not shown) and Ab (not shown) are the two elements engaged. If after shifting from $5^{th}$ gear to $4^{th}$ gear, the low lube pressure condition is eliminated, then either C1 (not shown) or B (not shown) clutch elements could be the possible cause of the leak. However, by looking at the elements already shifted through, the controller can determine that C1 (not shown) clutch is the source of the leak since C1 (not shown) was engaged in both $6^{th}$ gear and $5^{th}$ gear under the low lube condition. Step 140 checks for this type of situation by looking to see if one element was shifted through twice.

If yes, step 140 directs the algorithm to steps 136, 124 and 125. If no element was shifted through twice, step 140 directs the algorithm to step 142, which downshifts the transmission 64 to a gear that engages one of the clutch elements that was engaged before the dual element transmission shift that eliminated the low lube pressure condition.

Step 144 again compares the lube pressure P from sensor 32 to the threshold pressure Pt. If, in step 144, the lube pressure P is not less than threshold pressure Pt, control is directed to step 146. If, in step 132, the lube pressure P is less than threshold pressure Pt, control is directed to step 152.

Step 146 downshifts the transmission 64 to a gear that engages the other clutch element that was engaged before the dual element transmission shift that eliminated the low lube pressure condition, and directs the algorithm to step 148.

Step 148 again compares the lube pressure P from sensor 32 to the threshold pressure Pt. If, in step 148, the lube pressure P is not less than threshold pressure Pt, control is directed to step 104. If, in step 148, the lube pressure P is less than threshold pressure Pt, control is directed to step 152.

Returning to step 150, if the transmission is not in neutral, control is directed to step 152, else control is directed to step 154.

Step 152 stores in a memory of the VCU 40 the transmission elements which were shifted through when downshifting to neutral and directs control to step 130.

Figure 3D:
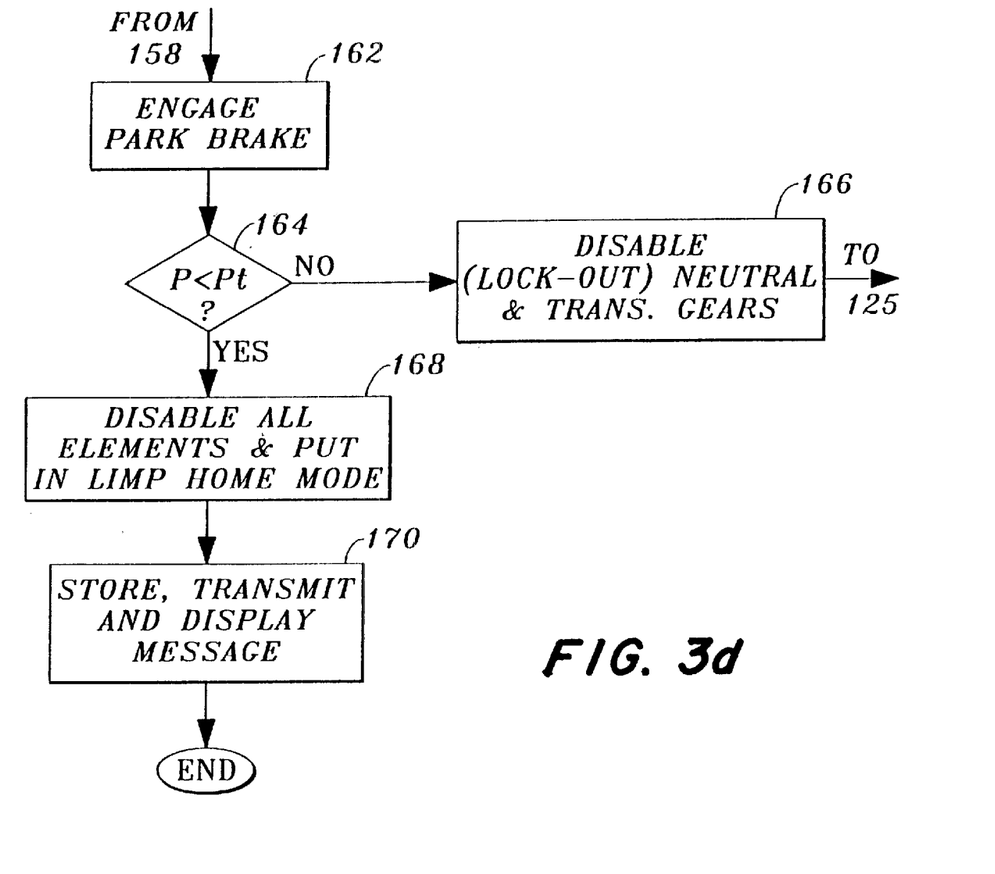

In step 154, if the PTO 70 is not engaged, control is directed to step 162, else control is directed to step 156.

Step 156 depressurizes or disengages the PTO 70 by causing valve 20 to close communication between pump 12 and PTO 70.

Step 158 compares the lube pressure P from sensor 32 to the threshold pressure Pt. If the lube pressure P is not less than threshold pressure Pt, control is directed to step 160 which locks out the PTO 70 and directs the algorithm to step 125. If the lube pressure P is less than threshold pressure Pt, control is directed to step 162.

Step 162 engages the park brake by closing valve 16b.

Step 164 again compares the lube pressure P from sensor 32 to the threshold pressure Pt. If the lube pressure P is not less than threshold pressure Pt, control is directed to step 166 which disables or locks-out neutral and the transmission gears. This is because the park brake release system is causing the leak. The algorithm then goes to step 125. If the lube pressure P is less than threshold pressure Pt, control is directed to step 168.

Step 168 disables all elements and enables a limp home mode wherein only a pre-selected forward and reverse gear can be accessed by the operator. This allows the vehicle to be driven onto a truck or to the dealer for service. The forward and reverse gear is chosen so that the bearings in the transmission are moving at a relatively low speed so there is minimal risk of transmission damage under low lube conditions.

Step 170 stores, transmits and displays a warning message, after which the algorithm 100 ends.

While the present invention has been described in conjunction with a specific embodiment, it is understood that many alternatives, modifications and variations will be apparent to those skilled in the art in light of the foregoing description. For example, the algorithm described above could be used together with monitoring of hydraulic system pressure, instead of monitoring lube pressure. However, the resulting system would only detect large hydraulic system leaks, not small to medium size leaks which can still cause system failure due to lack of lubrication. Accordingly, this invention is intended to embrace all such alternatives, modifications and variations which fall within the spirit and scope of the appended claims.

We claim:

1. In a vehicle hydraulic system having a plurality of hydraulic function elements, a hydraulic pump for supplying pressurized hydraulic fluid to the plurality of hydraulic function elements via a corresponding plurality of hydraulic element control valves, an electronic control unit for controlling the element control valves, a method for monitoring the vehicle hydraulic system, the method comprising:

sensing a hydraulic pressure in the hydraulic system and comparing the sensed pressure to a threshold pressure;

if the sensed pressure is less than the threshold pressure, testing a set of the hydraulic function elements one after another; and if, as a result of testing one of the set of hydraulic function elements, the sensed pressure becomes not less than the threshold pressure, deactivating said one tested hydraulic function element and generating a corresponding message.

2. The method of claim 1, wherein:

the hydraulic function elements include a first set of elements, the testing of which is not easily perceivable by an operator of the system, and a second set of elements, the testing of which is easily perceivable by the operator; and said first set of elements is tested before said second set of elements.

3. The method of claim 2, wherein:
the first set of elements includes at least an MFWD clutch element.

4. The method of claim 2, wherein:
the first set of elements includes at least a differential lock element.

5. The method of claim 2, wherein:
the second set of elements includes at least a transmission control element.

6. The method of claim 2, wherein:
the second set of elements includes at least a parking brake control element.

7. The method of claim 2, wherein:
the second set of elements includes at least a power take off control element.

8. The method of claim 1, further comprising:
determining which of said plurality of elements is causing a low pressure, and disabling said causing element.

9. The method of claim 1, wherein:
the threshold pressure varies as a function of engine speed and oil temperature.

10. The method of claim 1, further comprising:
comparing the sensed pressure to the pressure threshold and disabling at least one of the elements if the sensed pressure is less than said threshold pressure for at least a certain time period.

11. The method of claim 1, further comprising:
monitoring operation of the elements;
storing in a memory information associated with a most recently operated one of said elements;
comparing the sensed pressure to the pressure threshold; and
if the sensed pressure is less than said threshold pressure for at least a certain time period, testing said most recently operated one of said elements before any other elements are tested.

12. The method of claim 11, further comprising:
if, as a result of testing said most recently operated one of said elements, the sensed pressure remains below the threshold pressure, then testing the other of said elements in a predetermined order.

13. The method of claim 1, wherein:
at least some of said elements are transmission control elements of a powershift transmission; and
if, as a result of testing all said elements, the sensed pressure remains below the threshold pressure, then placing the transmission control elements in a state so that the powershift transmission is a limp home mode wherein only a single reverse gear and a single forward gear are operable.

14. The method of claim 1, wherein:
the hydraulic system includes a lubrication circuit, the pump also supplying lube fluid to the lubrication circuit; and
the sensed pressure is a lube pressure of lube fluid in the lubrication circuit.

15. In a vehicle hydraulic system having a hydraulic pump for supplying pressurized hydraulic fluid to a plurality of hydraulic elements via a corresponding plurality of hydraulic element control valves, and for supplying lube fluid to a lubrication circuit, a system for monitoring and protecting the vehicle hydraulic system, comprising:

a pressure sensor coupled to the lubrication circuit for generating a lube pressure signal; and a control unit which receives the lube pressure signal, the control unit diagnosing a status of each of the plurality of hydraulic elements, and controlling the corresponding control valves and the transmission control element valve as a function of the lube pressure signal.

16. The system of claim 15, wherein:
the control unit determines which of said plurality of elements is causing a low lube pressure, and the control unit disables said causing element.

17. The system of claim 16, wherein:
the control unit, for each element, compares the lube pressure signal to a pressure threshold and disables at least one of the elements if the lube pressure signal is less than said threshold.

18. The system of claim 17, wherein:
the threshold pressure varies as a function of engine speed and oil temperature.

19. The system of claim 16, wherein:
the control unit, for each element, compares the lube pressure signal to a pressure threshold and disables at least one of the elements if the lube pressure signal is less than said threshold for at least a certain time period.

20. The system of claim 19, wherein:
the threshold pressure varies as a function of engine speed and oil temperature.

21. In a vehicle hydraulic system having a hydraulic pump for supplying pressurized hydraulic fluid to a plurality of hydraulic function elements via a corresponding plurality of hydraulic element control valves, and for supplying lube fluid to a lubrication circuit, a method for monitoring and protecting the vehicle hydraulic system, the method comprising:

sensing a lube pressure of lube fluid in the lubrication circuit;

comparing the sensed lube pressure to a threshold;

if the sensed lube pressure is less than the threshold, performing an operation on each hydraulic function element one after another;

after each hydraulic function element is operated, comparing the sensed lube pressure to the threshold; and if the sensed lube pressure is not less than the threshold, deactivating the activated hydraulic function element and generating a corresponding message.

22. The method of claim 21 wherein:

the threshold pressure varies as a function of engine speed and oil temperature.

23. In a vehicle hydraulic system having a hydraulic pump for supplying pressurized hydraulic fluid to a plurality of hydraulic function elements via a corresponding plurality of hydraulic element control valves, and for supplying lube fluid to a lubrication circuit, a method for monitoring and protecting the vehicle hydraulic system, the method comprising:

sensing a lube pressure of lube fluid in the lubrication circuit;

comparing the sensed lube pressure to a threshold;

if the sensed lube pressure is less than the threshold for a certain time period, performing an operation on each hydraulic function element one after another;

after each hydraulic function element is operated, comparing the sensed lube pressure to the threshold; and if, as a result of said operation being performed on one of the hydraulic functions, the sensed lube pressure is not less than the threshold for said certain time period, deactivating said one hydraulic function element and generating a corresponding message.

24. In a vehicle hydraulic system having a plurality of hydraulic function elements, a hydraulic pump for supplying pressurized hydraulic fluid to the plurality of hydraulic function elements via a corresponding plurality of hydraulic element control valves, an electronic control unit (ECU) for controlling the element control valves, the pump also supplying lube fluid to a lubrication circuit, a method for monitoring the vehicle hydraulic system, the method comprising:

sensing a lube pressure of lube fluid in the lubrication circuit;

comparing the sensed lube pressure to a threshold;

if the sensed lube pressure is less than the threshold for a certain time period, performing an operation on each hydraulic function element one after another;

after each hydraulic function element is operated, comparing the sensed lube pressure to the threshold; and if, as a result of said operation being performed on one of the hydraulic functions, the sensed lube pressure is not less than the threshold for said certain time period, deactivating said one hydraulic function element and generating a corresponding message.

* * * * *